(12) United States Patent
Eichlseder

(10) Patent No.: US 7,118,372 B2
(45) Date of Patent: Oct. 10, 2006

(54) MOLDING TOOL HAVING A HEATING AND COOLING MEDIUM

(75) Inventor: Martin Eichlseder, Tettenweis (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 84 days.

(21) Appl. No.: 10/984,069

(22) Filed: Nov. 9, 2004

(65) Prior Publication Data

US 2005/0064061 A1    Mar. 24, 2005

Related U.S. Application Data

(63) Continuation of application No. PCT/EP03/04420, filed on Apr. 28, 2003.

(30) Foreign Application Priority Data

May 15, 2002 (DE) ................. 102 21 558

(51) Int. Cl.
*B29C 45/73* (2006.01)

(52) U.S. Cl. ............. 425/547; 264/328.16; 425/548; 425/552

(58) Field of Classification Search .............. 425/547, 425/548, 552, 143, 144; 264/328.14, 328.16
See application file for complete search history.

(56) References Cited

U.S. PATENT DOCUMENTS 2,911,680 A * 11/1959 Walter ........................ 425/170
4,201,742 A * 5/1980 Hendry ....................... 264/45.5
4,934,918 A   6/1990 Outland
5,792,492 A * 8/1998 Takahashi .................... 425/547
6,558,152 B1 * 5/2003 Yasuda et al. ............... 425/552

FOREIGN PATENT DOCUMENTS

| DE | 30 17 559 A | 11/1981 |
|---|---|---|
| DE | 195 33 045 A | 3/1997 |
| JP | 59 042934 A | 3/1984 |
| JP | 63 078720 A | 4/1988 |
| JP | 03 010811 A | 1/1991 |
| JP | 04 197722 A | 7/1992 |
| JP | 11 058474 A | 3/1999 |
| JP | 2002 096351 A | 4/2002 |
| JP | 2002 096352 A | 4/2002 |
| WO | WO 01/38062 A | 5/2001 |

* cited by examiner

*Primary Examiner*—Tim Heitbrink
(74) *Attorney, Agent, or Firm*—Henry M. Feiereisen

(57) ABSTRACT

A mold portion of a molding tool for making plastic articles includes a base body defining a cavity surface and having formed therein at least one heating channel, and at least one cooling channel separated from the heating channel and having a cross section which is smaller than a cross section of the heating channel. The cooling channel is positioned hereby closer to the cavity surface than the heat channel and thus is in an area between the heat channel and the cavity surface, thereby defining a cavity-proximal cooling channel and a cavity-distal heat channel. Before the injection process, the cavity surface is heated by the heat channel to a higher temperature than the demolding temperature of the plastic article to be formed. At the end of the injection process, the cavity surface is cooled by the cooling system.

11 Claims, 2 Drawing Sheets

MOLDING TOOL HAVING A HEATING AND COOLING MEDIUM

CROSS-REFERENCES TO RELATED APPLICATIONS

This application is a continuation of prior filed copending PCT International application no. PCT/EP03/04420, filed Apr. 28, 2003, which designated the United States and on which priority is claimed under 35 U.S.C. §120, the disclosure of which is hereby incorporated by reference, and which claims the priority of German Patent Application, Serial No. 102 21 558.8, filed May 15, 2002, pursuant to 35 U.S.C. 119(a)–(d).

BACKGROUND OF THE INVENTION

The present invention relates, in general, to the field of injection molding plastic articles.

Nothing in the following discussion of the state of the art is to be construed as an admission of prior art.

A high surface quality and good molding properties can be achieved by heating a molding tool during or after the cavity has been filled with plastic material and by cooling the molding tool to a temperature below the demolding temperature. One approach suggested heretofore is the arrangement of a fluid passageway in one mold portion or both mold portions of the molding tool and using the fluid passageway to alternatingly conduct liquid coolant and liquid heating medium. This procedure results, however, in long cycle times because of the large masses that need to be heated or cooled and is thus unable to meet current demands for maintaining process parameters, for example when microstructures are molded for manufacturing CDs, DVDs, writeable CDs and writeable DVDs and the like.

German patent publication DE 195 33 045 A1 describes a molding tool having a mold portion formed near the cavity surface in a single plane with heating channels and neighboring separate cooling channels, for alternating conduction of a heating medium or a coolant. As a result, the temperature of the cavity surface fluctuates between regions in immediate proximity of the cooling channels, on one hand, and in regions in immediate proximity of the heating channels, on the other hand. These temperature fluctuations continue even when the heating system is switched off during the cooling phase, as heat cannot dissipate fast enough to attain in the regions of the heating channels the same temperature during the cooling phase as in the regions of the cooling channels. The same shortcoming applies during heating action, when the cooling channel system is off. The temperature profile of the cavity surface thus becomes uneven, thereby adversely affecting the quality of the plastic article. These shortcomings are especially of concern, when molding microstructures of CD substrates and DVD substrates are involved. In addition, the need to shut down the heating system during the cooling action is another drawback of this conventional mold because it prolongs the time required to re-heat the cavity surface to the initial starting temperature at the beginning of the injection process, after the molded article has been removed.

It would therefore be desirable and advantageous to provide improvements in the field of injection molding to attain high surface quality and superior molding capability of a plastic article being molded, while the overall process has short cycle times.

SUMMARY OF THE INVENTION

According to one aspect of the present invention, a mold portion of a molding tool for making a plastic article includes a base body defining a cavity surface and having formed therein a heat channel system including at least one heating channel, and a cooling channel system separated from the heat channel system and including at least one cooling channel, wherein the cooling channel has a cross section which is smaller than a cross section of the heating channel, wherein the cooling channel system is positioned closer to the cavity surface than the heat channel system so as to position the cooling channel system in an area between the heat channel system and the cavity surface, thereby defining a cavity-proximal cooling channel system and a cavity-distal heat channel system.

The present invention resolves prior art problems by providing the mold portion with two heat-transfer planes, namely a cavity-proximal cooling plane and a cavity-distal heating plane. As a result, the plastic material can be effectively cooled during the cooling phase, with the cooling channel system serving as barrier against the heat channel system. This effect can be further enhanced, when thermally insulating the cooling channel system on the side to the heat channel system. Thus, the heat channel system can continue to operate during the cooling phase so that only the cavity-proximal region of the mold portion has to be re-heated after conclusion of the cooling phase.

In addition, the cooling channel system can serve in a heating phase also for heat transfer. In view of its arrangement near the cavity surface, the cooling channel system can be dimensioned small so that coolant in the cooling channel can be quickly heated up, when no circulation of coolant is involved, so that coolant can then be used for transfer of heat energy in the direction of the cavity surface. As a consequence of its small dimension, the cooling channel system can be configured such that the cooling channel meanders at narrow distances in a plane that is parallel and close to the cavity surface, or the cooling channel system may have plural cooling channels that extend at close distances to one another.

According to another feature of the present invention, the base body may have a laminated construction comprised of a base plate, a heating plate which includes the heat channel system, and a cooling plate which includes the cooling channel system.

According to another feature of the present invention, the cooling channel of the cooling channel system can be separated from one another by webs having a length which is equal or smaller than a distance between the cooling channels and the cavity surface. This configuration is beneficial when manufacturing CD-substrates or DVD substrates because of the good barrier effect that can be realized, and may even be enhanced when the length of the webs between the cooling channels is smaller than a length of webs between the heating channels.

When the coolant is conducted at a high flow rate through the cooling channel system, for example by using a sufficiently powerful pump, there is no need to maintain the temperature of the coolant significantly below the demolding temperature. Rather, the high flow rate of the coolant is able to rapidly carry heat away.

The relatively greater distance of the heat channel system from the cavity surface realizes an even temperature of the molding surface during the injection process.

The heat channel system and the cooling channel system are configured for conduction of medium heating and cooling media. It is, however, also conceivable, to integrate in the heat channel system heating elements such as resistor elements or the like. In addition, the heat channel system or the cooling channel system may be configured as single passageway in the form of a heating coil or cooling coil, or may be configured of several single channels through which coolant or heating medium flows in same direction or opposite direction.

According to another aspect of the present invention, a molding tool for making plastic articles includes a mold portion, as set forth above.

According to still another aspect of the present invention, an injection molding machine includes a mold portion, as set forth above, a device for heating and circulating a heating medium, and a device for cooling and circulating a coolant.

According to yet another aspect of the present invention, a method of molding a plastic article with an injection molding machine includes the steps of a) heating a mold cavity by a heating unit to a temperature above a demolding temperature of plastic being processed by conducting a heating medium through a cavity-distal heat channel system, b) starting to inject plastic material into the mold cavity, c) terminating the injection of plastic material while starting a cooling action by conducting a coolant through a cavity-proximal cooling channel system, d) concluding the cooling action before or at reaching the demolding temperature, thereby forming a plastic product, and e) removing the plastic product and starting the heating step, whereby the heating unit continues to operate or is switched off in steps b) to d).

The present invention resolves prior art problems by providing a two-stage cooling process. In the first phase (1. stage), the temperature of the cavity surface is above the demolding temperature but below the melting temperature. In this phase, at least one cavity surface of the molding tool is heated, prior to injection of plastic material, by a heating unit to a desired temperature by conducting a heating medium, e.g. hot water, through the cavity-distal heat channel system. In the second phase (2. stage), the temperature of the cavity surface is below the demolding temperature. When ending the injection of plastic material, the cavity surface is rapidly cooled down below the demolding temperature by a cooling unit by conducting coolant through the cavity-proximal cooling channel system. As soon as the demolding temperature has been reached or the temperature of the cavity surface falls below the demolding temperature, the finished plastic article can be removed. As a result, the molding tool can have a high temperature during the injection process, and a good internal pressure distribution in the molding tool is realized while ensuring short cycle times.

Suitably, the region of the molding tool behind the cooling channels is continuously heated. Only during a brief cooling phase, coolant, e.g. water, is additionally conducted through the cooling channels at high throughput rate to abruptly cool down the cavity surface. This has the advantage that, following the cooling phase, the full heat energy stored in the molding tool is available in the area behind the cooling channel system and is able to rapidly reach the cavity surface to re-heat it in a short time to the injection temperature. This process can be assisted by withdrawing the coolant through suction so as to prevent any coolant from being heated.

According to another aspect of the present invention, a method of molding a plastic article with an injection molding machine includes the steps of a) heating a mold cavity of a molding tool to a temperature above a demolding temperature of plastic being processed by conducting a heating medium through a cavity-distal heat channel system, b) starting to inject plastic material into the mold cavity, c) terminating the injection of plastic material while starting a cooling action by a cooling unit by conducting a coolant through a cavity-proximal cooling channel system, d) concluding the cooling action before or upon reaching the demolding temperature, thereby forming a plastic product, and e) removing the plastic product and starting step a), wherein the step d) includes withdrawing the coolant. This process has the advantage that coolant is not heated during the heating phase, thereby eliminating the need to carry away initially heated coolant at the beginning of the cooling phase.

Depending on the plastic article being produced, it is possible to operate the heat channel system and the cooling channel system with the same temperature near below the demolding temperature, and to add the cooling channel system in the cooling phase to the heat transport.

According to another aspect of the present invention, a method of molding a plastic article with an injection molding machine includes the steps of a) operating a heating unit by conducting a heating medium through the cavity-distal heat channel system, and operating a cooling unit by conducting a coolant through the cavity-proximal cooling channel system, b) starting to inject plastic material into the mold cavity, c) terminating the injection of plastic material, d) allowing a formed plastic article to cool down, and e) removing the plastic article. This process results in very short cycle times as the cooling channel system is continuously operated while the heat channel system also continuously runs. During injection phase and partly during the cooling phase, the cooling channel system is heated by the injected hot plastic melt. As the cooling channel system is heated up quasi on both sides and has to carry away heat, a comparably soft cooling curve is obtained which can positively affect the shrinkage behavior of the molded article.

According to another feature of the present invention, the mold cavity may be bounded by two half-molds having cavity surfaces of different structures, wherein the heating action and the cooling action can be adjusted to different conditions. In other words, the half-molds may be heated, for example, to different temperatures.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
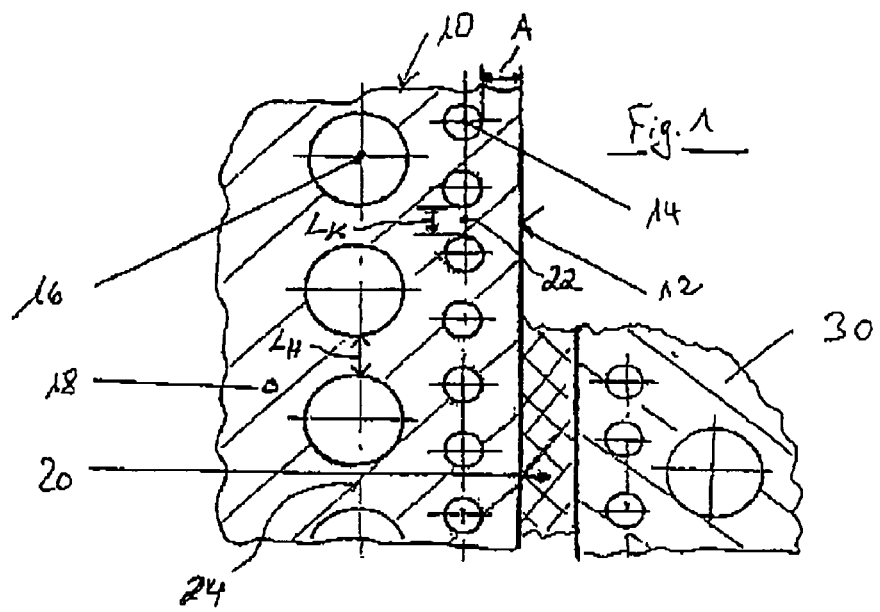
FIG. 1 is a fragmentary sectional view of a closed molding tool according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a fragmentary sectional view of a closed molding tool according to the present invention for making a plastic article, having mating mold portion (half-mold) 10 and mold portion (half-mold) 30 which, when closed, define a closed cavity in which plastic material 20 is injected. The mold portions 10, 30 are normally of identical construction, and hence only the mold portion 10 will hereinafter be described in detail. The mold portion 10 has a base body 18 and a cavity surface 12. Disposed in proximity of the cavity surface 12 at a distance A thereto is a cooling channel system comprised of plural cooling channels 14 in parallel relationship, whereby neighboring cooling channels 14 are separated by walls 22 of a length $L_K$, whereby the length $L_K$ is equal or smaller than the distance A. Persons skilled in the art will understand that the construction of the cooling channel system in the form of plural parallel cooling channels is by way of example only as the cooling channel system may comprise only one cooling channel which may be configured in a winding or meandering manner near the cavity surface 12.

Extending parallel to and behind the cooling channels 14 is a heat channel system comprised of plural heating channels 16 in parallel relationship, whereby neighboring heating channels 16 are separated by walls 24 of a length $L_H$ which is greater than the length $L_K$ of the webs 22. As clearly shown in FIG. 1, the heating channels 16 have a cross section which is significantly greater than the cross section of the cooling channels 14. Persons skilled in the art will again understand that the construction of the heat channel system in the form of plural parallel heating channels is by way of example only as the heat channel system may comprise only one heating channel which may be configured in a winding or meandering manner at a further distance to the cavity surface 12.

The mold portion 10 is thus so constructed as to have cavity-proximal cooling channels 14 and cavity-distal heating channels 16. In this application, the terms "cavity-proximal" and "cavity-distal" are not limited to any particular distance, but should be construed as a disposition of the heating channels 14 in relation to the heating channels 16 with respect to the cavity surface 12.

At operation, a heating medium and/or a coolant, such as e.g. water or oil, are conducted through the heating channels 16 and the cooling channels 14, respectively. Suitably, coolant is pumped by a displacement pump, e.g. gear pump, to realize a high efficiency. Optionally, the cooling channel system may be used alternatingly for heating and cooling so that only small masses need to be heated.

Currently preferred is the use of the mold portion 10 in a two-stage cooling process. In the cooling phase, the cooling channel system acts as barrier to the cavity to prevent heating of the cavity. The part of the base body 18 of the mold portion 10 which is distal to the cooling channel system is at a high temperature, once cooling is switched off so that this part of the base body 18 serves as heat accumulator that can rapidly heat the cavity. After demolding, the cooling channel system is switched off, and the cavity is re-heated by the heat channel system until commencement of the next cycle.

Upon consideration of the heat conductivity of the mold portion 10 and the distance A of the cooling channel system to the cavity surface 12, in particular upon consideration of the above-described dimensions $L_K$, $L_H$, and A, the cooling action can be switched off already before demolding. Suitably, the switch-off moment of the cooling channel system is so selected that the cavity reaches the demolding temperature precisely at the time when the article is to be demolded and that the cavity surface is re-heated immediately following the demolding operation. The heating step may hereby begin at the time when a demolding robot just about has removed the molded article and the molding tool is still open.

A higher cavity temperature during injection results in the application of a smaller injection pressure, less clamping force, even internal mold pressure, better molding operation, higher surface luster, and less stress in the produced plastic article.

As a consequence of the tow-stage cooling action, the cavity temperature is higher during the injection phase than during the cooling phase and is evenly distributed across the entire cavity surface 12 so that the cooling time is shortened and a shorted cycle time is realized compared to conventional approaches, while the quality of the produced plastic article remains unaffected. The high cavity temperature allows the production of a very high article quality also because the injected mass remains liquid for a longer time so that good molding results in the cavity become possible also in an area remote to the gate. In particular, when the manufacture of CD substrates or DVD substrates is involved, the molding process is superior in connection with microstructures. In addition, the production of thin-walled parts is possible. One example involves the production of a data storage disc of the type BLUE-RAY disc which requires molding of a film as cover layer with a thickness 100 microns.

Figure 2:
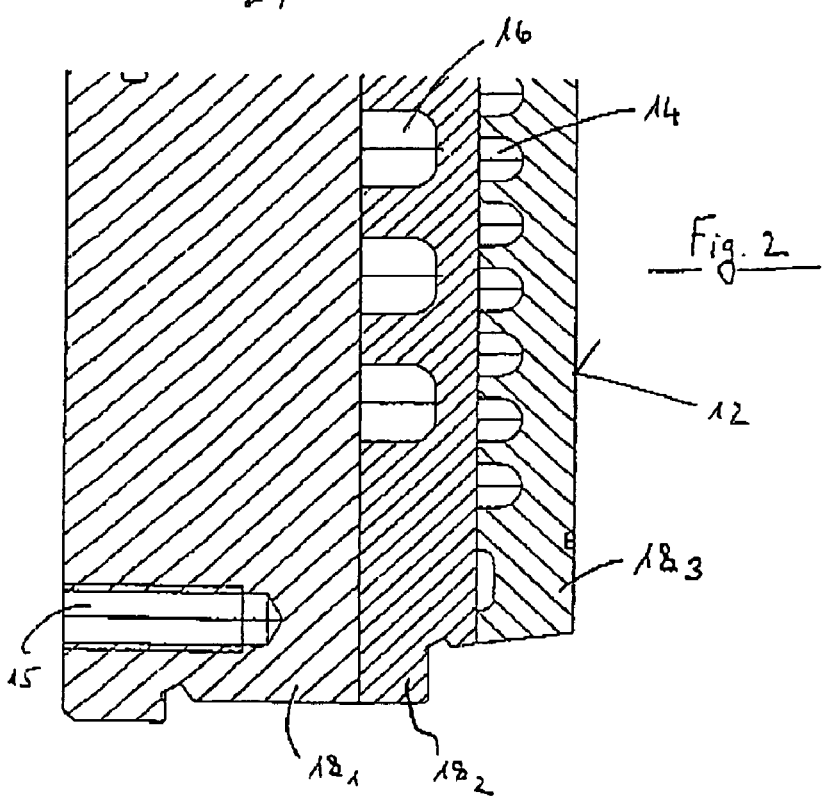
FIG. 2 is a fragmentary sectional view of a mold portion of another embodiment of a molding tool in accordance with the present invention.

Whereas FIG. 1 shows the mold portions 10, 30 with massive base body 18 having formed therein the cooling channels 14 and the heating channels 16 as bores, FIG. 2 shows a fragmentary sectional view of a mold portion in the form of a laminated structure, generally designated by reference numeral 25. Parts corresponding with those in FIG. 1 are denoted by identical reference numerals and not explained again. The description below will center on the differences between the embodiments. In this embodiment, the mold portion 25 is comprised of a base plate $18_1$, a heat plate $18_2$, and a cooling plate $18_3$. The cooling channels 14 in the cooling plate $18_3$, and the heating channels 16 in the heat plate $18_2$ are configured as recesses, for example, of U-shaped or semicircular cross section, as the plates $18_1$, $18_2$, $18_3$ are stacked in the illustrated sequence. The juxtaposed arrangement of the plates $18_1$, $18_2$, $18_3$ is secured by fasteners, whereby the heating channels 16 are closed by the base plate $18_1$, and the cooling channels 14 of the cooling plate $18_3$ are closed by the surface of the heat plate $18_2$. The side of the plate $18_3$ that is distant to the cooling channels 14 serves hereby as cavity surface 12. The base plate $18_1$ carries, for example, fastening means 15 for mounting the mold portion 25 for example to a platen of an injection molding machine.

Figure 3:
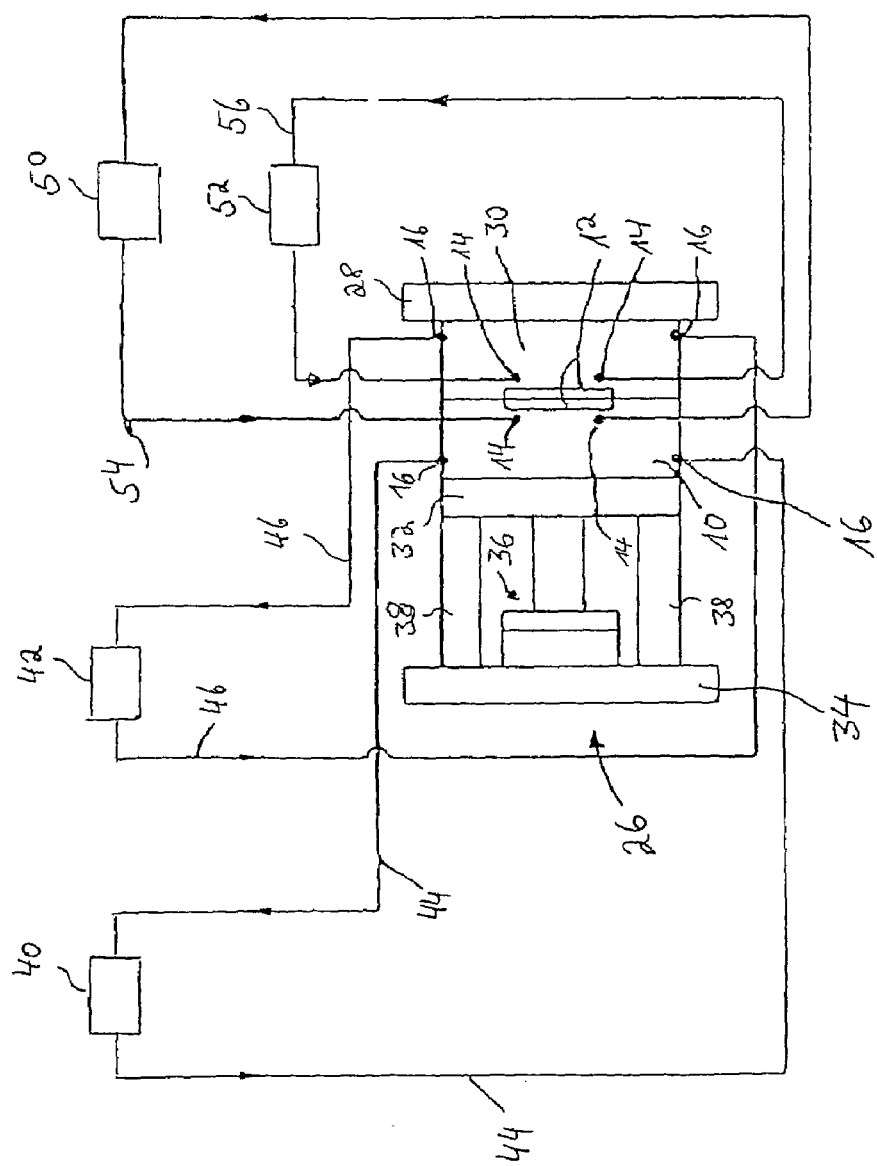
FIG. 3 is a schematic illustration of a clamping unit of an injection molding machine with illustration of the heat channel system for conduction of a heating medium, and the cooling channel system for conduction of a coolant.

Turning now to FIG. 3, there is shown a schematic illustration of a clamping unit 26 of an injection molding machine, with illustration of the heat channel system for conduction of a heating medium, and the cooling channel system for conduction of a coolant. The clamping unit 26 has a fixed platen 28 for attachment of a fixed molding portion 30, a moving platen 32 for attachment of a moving molding portion 10, and a support platen 34. Tie rods 38 extend between the moving platen 32 and the support platen 34 for guiding a movement of the moving platen 32 in relation to the fixed platen 28. Operatively connected to the support platen 34 is a drive mechanism 36 by which the back and forth movement of the moving platen 32 is implemented. Connected to the heat channel system 16 in the moving mold portion 10 is a first heating medium circuit 44 with a first device 40 for heating and circulating a heating medium. Likewise, a second heating medium circuit 46 is connected to the heat channel system 16 in the fixed mold portion 30 with a second device 40 for heating and circulating a heating medium. Coolant circuits 54, 56 with devices 50, 52 for cooling and circulating a coolant are connected to the cooling channels 14 in proximity of the cavity surfaces 12. For ease of illustration, the cooling channels 14 and the heating channels 16, formed inside the mold portions 10, 30, are not illustrated here in detail.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A mold portion of a molding tool for making a plastic article, comprising a base body defining a cavity surface and having formed therein a heat channel system for circulation of a heating medium, and a cooling channel system separated from the heat channel system for circulation of a coolant, wherein the cooling channel system has a channel cross section which is smaller than a channel cross section of the heating channel system, wherein the cooling channel system is positioned closer to the cavity surface than the heat channel system so as to position the cooling channel system in an area between the heat channel system and the cavity surface, thereby defining a cavity-proximal cooling channel system and a cavity-distal heat channel system.

2. The mold portion of claim 1, wherein the cooling channel system is thermally insulated in a direction of the heat channel system.

3. The mold portion of claim 1, wherein the base body has a laminated construction comprised of a base plate, a heating plate which includes the heat channel system, and a cooling plate which includes the cooling channel system.

4. The mold portion of claim 3, wherein the heat channel system is bounded by a surface of the base plate, and the cooling channel system is bounded by a surface of the heating plate.

5. The mold portion of claim 1, wherein the cooling channel system has a plurality of cooling channels which are separated from one another by first webs having a length which is equal or smaller than a distance between the cooling channels and the cavity surface.

6. The mold portion of claim 5, wherein the heat channel system has a plurality of heating channels which are separated from one another by second webs, wherein the length of the first webs between the cooling channels is smaller than a length of the second webs between the heating channels.

7. The mold portion of claim 1, wherein the cooling channel system is arranged in a first plane in parallel relationship to the cavity surface, wherein the heat channel system is arranged in a second plane in parallel relationship to the first plane, and wherein the first plane is positioned closer to the cavity surface than the second plane.

8. The mold portion of claim 1, wherein the cooling channel system has a cooling channel which is configured to meander at narrow distances in a plane that is parallel and close to the cavity surface.

9. The mold portion of claim 1, wherein the cooling channel system has plural cooling channels that extend at close distances to one another.

10. A molding tool for making a plastic article, comprising a mold portion including a base body defining a cavity surface and having formed therein a heat channel system for circulation of a heating medium, and a cooling channel system separated from the heat channel system for circulation of a coolant, wherein the cooling channel system has a channel cross section which is smaller than a channel cross section of the heating channel system, wherein the cooling channel system is positioned closer to the cavity surface than the heat channel system so as to position the cooling channel system in an area between the heat channel system and the cavity surface, thereby defining a cavity-proximal cooling channel system and a cavity-distal heat channel system.

11. An injection molding machine, comprising:
a molding tool including a mold portion including a base body defining a cavity surface and having formed therein a heat channel system for circulation of a heating medium, and a cooling channel system separated from the heat channel system for circulation of a coolant, wherein the cooling channel system has a channel cross section which is smaller than a channel cross section of the heating channel system, wherein the cooling channel system is positioned closer to the cavity surface than the heat channel system so as to position the cooling channel system in an area between the heat channel system and the cavity surface, thereby defining a cavity-proximal cooling channel system and a cavity-distal heat channel system;
a device for heating and circulating the heating medium; and
a device for cooling and circulating the coolant.

* * * * *